US007118795B2

(12) United States Patent
Ishizaki et al.

(10) Patent No.: US 7,118,795 B2
(45) Date of Patent: Oct. 10, 2006

(54) PROCESS OF PRODUCING OPTICAL ELEMENT AND OPTICAL ELEMENT

(75) Inventors: Kouji Ishizaki, Tokyo-To (JP); Masanori Umeya, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/274,373

(22) Filed: Oct. 21, 2002

(65) Prior Publication Data

US 2003/0077421 A1    Apr. 24, 2003

(30) Foreign Application Priority Data

Oct. 23, 2001    (JP)    .............. 2001-324808

(51) Int. Cl.
*C09K 19/36* (2006.01)
*C09K 19/00* (2006.01)
*B32B 3/00* (2006.01)
*G02F 1/1335* (2006.01)

(52) U.S. Cl. .............. 428/156; 428/1.1; 349/106; 349/107; 252/299.7

(58) Field of Classification Search ............... 428/1.1, 428/1.2, 156; 349/106, 107, 115, 113, 108, 349/109, 146, 144, 97; 252/299.1, 299.7
See application file for complete search history.

(56) References Cited

U.S. PATENT DOCUMENTS

| | | | | |
|---|---|---|---|---|
| 4,346,963 A * | 8/1982 | Kobale et al. | ............... | 349/122 |
| 5,221,982 A | 6/1993 | Faris | ............... | 359/93 |
| 5,235,218 A | 8/1993 | Matsuo et al. | ............... | 307/443 |
| 5,235,443 A | 8/1993 | Barnik et al. | ............... | 359/37 |
| 5,267,060 A | 11/1993 | Colton | ............... | 359/15 |
| 5,295,009 A | 3/1994 | Barnik et al. | ............... | 359/65 |
| 5,691,789 A * | 11/1997 | Li et al. | ............... | 349/98 |
| 5,793,456 A | 8/1998 | Broer et al. | ............... | 349/98 |
| 5,897,187 A * | 4/1999 | Aoki et al. | ............... | 349/144 |
| 6,067,138 A | 5/2000 | Nishiguchi et al. | ............... | 349/117 |
| 6,071,438 A | 6/2000 | Leigeber et al. | ............... | 252/585 |
| 6,421,107 B1 | 7/2002 | Greenfield et al. | ............... | 349/115 |
| 6,661,484 B1 * | 12/2003 | Iwai et al. | ............... | 349/107 |
| 2001/0030720 A1 | 10/2001 | Ichihashi | ............... | 349/106 |
| 2002/0089479 A1* | 7/2002 | Sato et al. | ............... | 345/87 |

FOREIGN PATENT DOCUMENTS

| | | |
|---|---|---|
| EP | 0 634 674 A2 | 1/1995 |
| EP | 0 860 718 A2 | 8/1998 |
| EP | 1124153 A2 * | 8/2001 |
| GB | 2 260 203 A | 4/1993 |
| JP | 10-054905 | 2/1998 |

(Continued)

*Primary Examiner*—Harold Pyon
*Assistant Examiner*—Catherine A. Simone
(74) *Attorney, Agent, or Firm*—Oliff & Berridge, PLC

(57) ABSTRACT

A liquid crystal layer is formed on an alignment substrate 13 by the use of a photo-curing chiral nematic liquid crystal having cholesteric regularity, or the like, and liquid crystal-line molecules in the liquid crystal layer are aligned by the alignment-regulating action of the alignment substrate 13. A predetermined amount of radiation 20 is applied to the liquid crystal layer formed on the alignment substrate 13 to three-dimensionally cross-link and cure the liquid crystal layer, thereby forming a cholesteric layer 12 in the semi-cured state. Thereafter, the semi-cured cholesteric layer 12 formed on the alignment substrate 13 is brought into contact with an organic solvent 21 under the specific conditions. There is thus finally obtained an optical element 10 comprising the cholesteric layer 12 formed on the alignment substrate 13.

3 Claims, 7 Drawing Sheets

FOREIGN PATENT DOCUMENTS

| | | |
|---|---|---|
| JP | 10-316755 | 12/1998 |
| JP | 2000-345160 | 12/2000 |
| JP | 2001-159706 | 6/2001 |
| JP | 2002148660 A * | 5/2002 |
| WO | WO 00/34808 | 6/2000 |

* cited by examiner

———— BEFORE BROUGHT INTO CONTACT WITH
AN ORGANIC SOLVENT

-------- AFTER BROUGHT INTO CONTACT WITH
AN ORGANIC SOLVENT (SMALL AMOUNT OF UV APPLIED)

—·—·— AFTER BROUGHT INTO CONTACT WITH
AN ORGANIC SOLVENT (LARGE AMOUNT OF UV APPLIED)

PROCESS OF PRODUCING OPTICAL ELEMENT AND OPTICAL ELEMENT

BACKGROUND OF THE INVENTION

1. Field of the Invention

The present invention relates to a process of producing an optical element such as a circular-polarization-controlling element, and particularly relates to a process of producing an optical element by the use of a radiation-curing liquid crystalline material having cholesteric regularity, and to an optical element.

2. Description of Related Art

Optical elements comprising liquid crystal layers having cholesteric regularity (cholesteric layers) are widely used as circular-polarization-controlling elements (circularly polarizing plates, color filters, etc.) for use in liquid crystal displays.

To produce an optical element, such as a circularly polarizing plate that reflects all visible light, a reflection-type color filter on which each pixel is composed of regions having selective reflection wave ranges equal to the wave ranges of red (R), green (G) and blue (B) colors, or an optical element that is used in a transmission or semi-transmission liquid crystal display in order to improve light utilization efficiency, it is necessary to form a cholesteric layer having a broadened selective reflection wave range or a cholesteric layer having selective reflection wave ranges controlled to be equal to the wave ranges of red, green and blue colors. For this reason, there has been demanded a method of controlling the selective reflection wave range of a cholesteric layer with ease and high precision.

To fulfil this demand, the following methods have been proposed so far: (1) a method in which optically active groups composing the cholesteric structure of a cholesteric layer are modified or deactivated to change the selective reflection wave range of the cholesteric layer (Japanese Laid-Open Patent Publication No. 54905/1998), and (2) a method in which a liquid crystal layer having cholesteric regularity is brought into contact with a solvent or solvent mixture to broaden its selective reflection wave range (Japanese Laid-Open Patent Publication No. 316755/1998).

However, the above two methods are disadvantageous as described below. In the method (1), in which optically active groups in a cholesteric layer are modified or deactivated, the modified or deactivated molecules become impurities to lower the stability of the cholesteric layer itself. If such a cholesteric layer is incorporated into a liquid crystal display, the display cannot clearly display an image. With the method (2), on the other hand, only a cholesteric layer having lowered intensity of color is obtained. If such a cholesteric layer is incorporated into a liquid crystal display, the display cannot clearly display an image.

SUMMARY OF THE INVENTION

The present invention was accomplished in the light of the aforementioned drawbacks in the related art. An object of the present invention is therefore to provide a process of producing an optical element, which makes it possible to control the selective reflection wave range of a cholesteric layer with ease and high precision and to easily produce an optical element excellent in both optical stability and intensity of color, suitable for a liquid crystal display or the like; and an optical element.

A first aspect of the present invention is a process of producing an optical element, comprising the steps of: forming a radiation-curing liquid crystal layer having cholesteric regularity on an alignment substrate having an aligning function; applying a predetermined amount of radiation to the liquid crystal layer formed on the alignment substrate to cure the liquid crystal layer, thereby forming a cholesteric layer in the semi-cured state; and bringing the semi-cured cholesteric layer formed on the alignment substrate into contact with an organic solvent; wherein the amount of radiation to be applied to the liquid crystal layer is changed to control the selective reflection wave range of the cholesteric layer.

A second aspect of the present invention is a process of producing an optical element, comprising the steps of: forming a first radiation-curing liquid crystal layer having cholesteric regularity on an alignment substrate having an aligning function; applying a predetermined amount of radiation to the first liquid crystal layer formed on the alignment substrate to cure the first liquid crystal layer, thereby forming a first cholesteric film in the semi-cured state; bringing the semi-cured first cholesteric film formed on the alignment substrate into contact with an organic solvent; forming a second radiation-curing liquid crystal layer having cholesteric regularity on the first cholesteric film that has been brought into contact with the organic solvent; applying a predetermined amount of radiation to the second liquid crystal layer formed on the first cholesteric film to cure the second liquid crystal layer, thereby forming a second cholesteric film in the semi-cured state; and bringing the semi-cured second cholesteric film formed on the first cholesteric film into contact with an organic solvent; wherein the amount of radiation to be applied to the first and/or second liquid crystal layer is changed to control the selective reflection wave range of the first and/or second cholesteric film.

According to the first aspect of the present invention, the selective reflection wave range of the cholesteric layer can be controlled by varying the amount of radiation to be applied to the liquid crystal layer formed on the alignment substrate, so that it is possible to control the selective reflection wave range of the cholesteric layer with ease and high precision. It is therefore possible to easily produce an optical element that comprises a cholesteric layer having the desired selective reflection wave rage and that is excellent in both optical stability and intensity of color.

According to the second aspect of the present invention, the selective reflection wave ranges of the plurality of cholesteric films that constitute the cholesteric layer can be controlled by varying the amount of radiation to be applied to the liquid crystal layer formed on the alignment substrate or on the first cholesteric film, so that it is possible to control the selective reflection wave ranges of the plurality of cholesteric films with ease and high precision. It is therefore possible to easily produce an optical element that comprises a cholesteric layer composed of a laminate of a plurality of cholesteric films having different selective reflection wave rages and that is excellent in both optical stability and intensity of color.

DETAILED DESCRIPTION OF PREFERRED EMBODIMENTS

By referring to the accompanying drawings, embodiments of the present invention will be described hereinafter.

First Embodiment

First of all, an optical element according to a first embodiment of the present invention will be described.

Figures 1, 2:
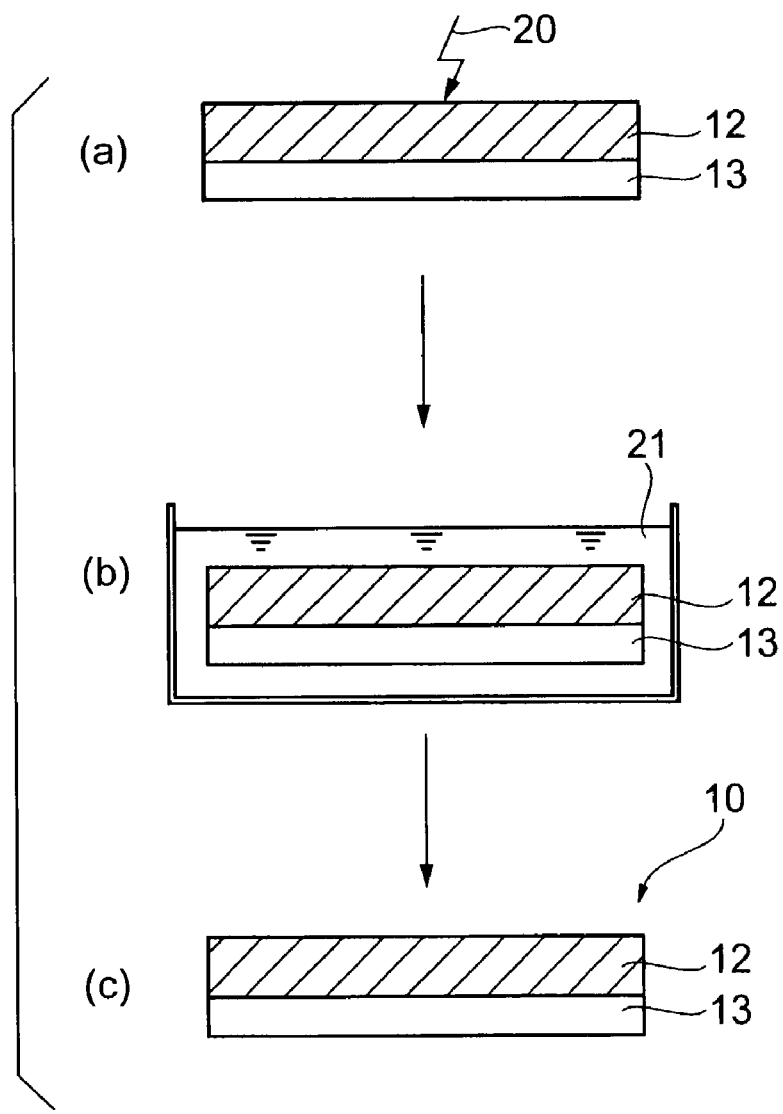
FIG. 1 is a cross-sectional view illustrating an optical element according to a first embodiment of the present invention.
FIG. 2 is a view illustrating an example of a process of producing the optical element shown in FIG. 1.

As shown in FIG. 1, an optical element 10 according to the first embodiment of the present invention is composed of: an alignment substrate 13 prepared by conducting alignment treatment; and a cholesteric layer 12 laminated to the alignment substrate 13.

The cholesteric layer 12 is made from a radiation-curing liquid crystalline material having cholesteric regularity, and has the polarized-light-separating property, that is, the property of separating a component circularly polarized in one direction from a component circularly polarized in the opposite direction according to the physical orientation (planar orientation) of liquid crystalline molecules in the liquid crystalline material. Namely, light entering into the cholesteric layer 12 along the helical axis of the planar orientation is split into right-handed circularly polarized component and left-handed circularly polarized component; one of these circularly polarized components is transmitted and the other one is reflected. This phenomenon is widely known as circular dichroism. If the direction of rotation of the circularly polarizing component is selected properly in terms of the direction of incident light, only a circularly polarized component rotated in the same direction as that of the helical axis of the cholesteric layer 12 is selectively reflected. Notes that the chiral pitch of liquid crystalline molecules in the cholesteric layer 12 determines the center wavelength of the selective reflection wave range of the cholesteric layer 12.

It is preferable to use, as the liquid crystalline material for forming the cholesteric layer 12, a cholesteric liquid crystal (chiral nematic liquid crystal) obtained by adding a chiral agent to a nematic liquid crystal (see Japanese Laid-Open Patent Publication No. 345160/2000). It is preferable that both the nematic liquid crystal and chiral agent in the liquid crystalline material have polymerizable groups or groups containing polymerizable groups. It is also preferable that a photopolymerization initiator be added to the liquid crystalline material.

Specifically, a liquid crystal containing a compound represented by the following chemical formula (1):

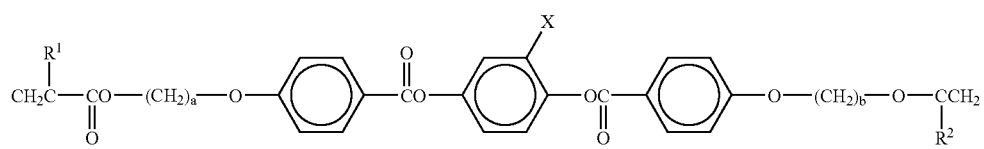
(1)

and a compound represented by the following chemical formula (2):

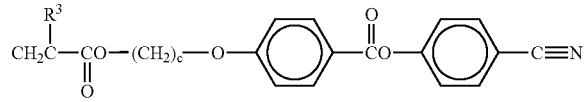
(2)

in a weight ratio between 99:1 and 50:50 can be used as the nematic liquid crystal. In the above chemical formulas (1) and (2), $R^1$, $R^2$ and $R^3$ independently represent hydrogen or methyl group; X represents hydrogen, chlorine, bromine, iodine, an alkyl group having 1 to 4 carbon atoms, methoxy group, cyano group or nitro group; and a, b and c are an integer of 2 to 12.

Further, it is preferable to use, as the chiral agent, a compound represented by the following chemical formula (3) or (4):

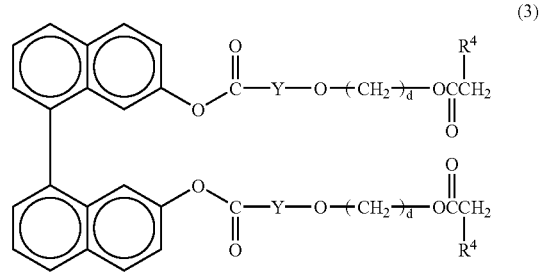
(3)

-continued
(4)
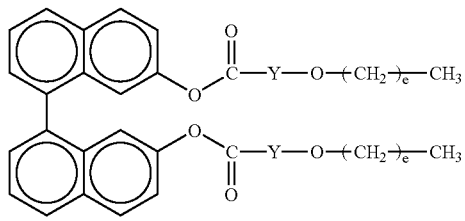
or a chiral dopant-added liquid crystal "S-811" (manufactured by Merck KGaA, Germany). In the above chemical formulas (3) and (4), $R^4$ represents hydrogen or methyl group; d and e are an integer of 2 to 12; and Y represents a divalent group selected from the following groups (i) to (xxiv):
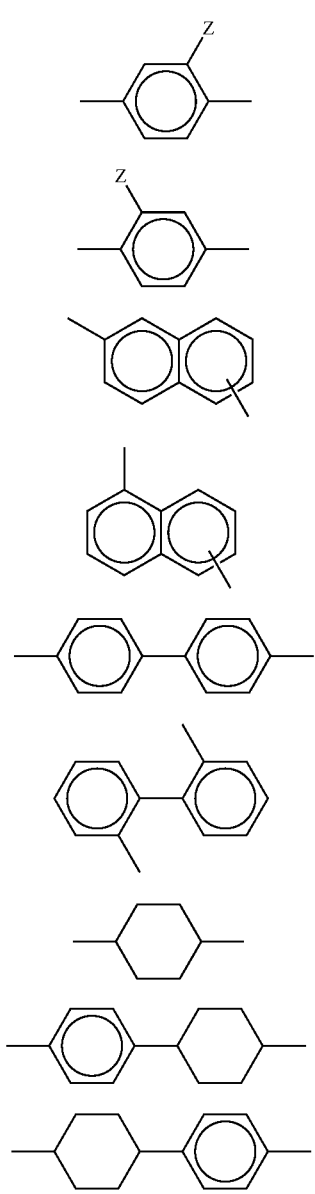
(i)
(ii)
(iii)
(iv)
(v)
(vi)
(vii)
(viii)
(ix)
-continued
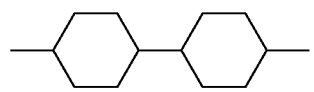 (x)
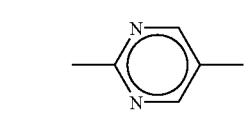 (xi)
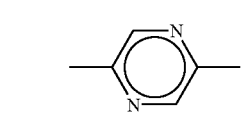 (xii)
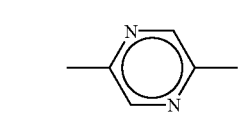 (xiii)
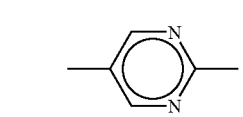 (xiv)
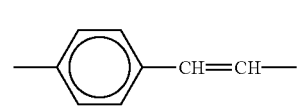 (xv)
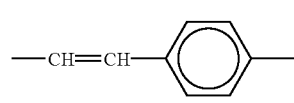 (xvi)
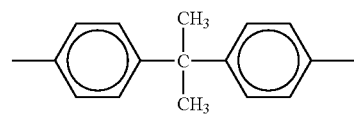 (xvii)
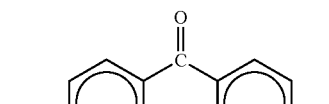 (xviii)
 (xix)
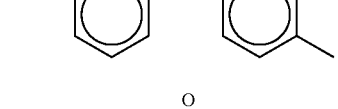 (xx)
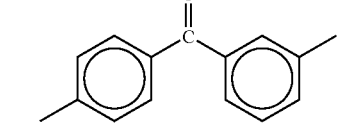 (xxi)
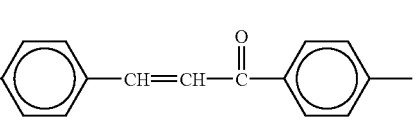 (xxii)

-continued

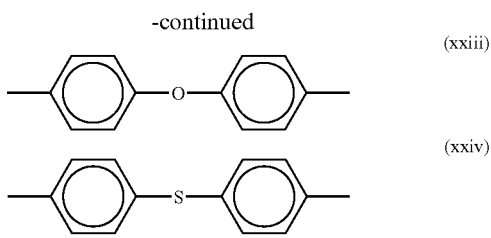

(xxiii)

(xxiv)

Next, by referring to FIGS. 2(a), 2(b) and 2(c), a process of producing the optical element 10 according to the first embodiment of the present invention, having the above-described constitution, will be described.

A glass substrate provided with a polyimide (PI) film that has been subjected to rubbing treatment, a supporting film having the function of aligning liquid crystalline molecules, or the like is prepared as the alignment substrate 13 prepared by conducting alignment treatment. On top of this alignment substrate 13, a liquid crystal layer is formed by the use of a radiation-curing liquid crystal having cholesteric regularity (a photo-curing chiral nematic liquid crystal, or the like). Liquid crystalline molecules in the liquid crystal layer are aligned by the alignment-regulating action of the alignment substrate 13, where the liquid crystal layer is subjected to heat treatment, if necessary. A predetermined amount of radiation 20 is applied to the liquid crystal layer formed on the alignment substrate 13 to three-dimensionally cross-link and cure the liquid crystal layer. A cholesteric layer 12 in the semi-cured state is thus formed (FIG. 2(a)). The radiation 20 herein used is to induce photopolymerization reaction or the like in the radiation-curing liquid crystal, and ultraviolet light, an electron beam, visible light, infrared light (heat rays), or the like can be used as the radiation. In the case where ultraviolet light is used to cure the liquid crystal, it is preferable to add a photopolymerization initiator in the liquid crystalline material beforehand. The amount of the radiation 20 to be applied varies depending on whether the photopolymerization initiator has been added or not, or on the amount of the photopolymerization initiator added or the type of the radiation to be applied. It is, however, preferable to apply the radiation 20 in an amount of approximately 0.01 to 10000 mJ/cm$^2$, for example. By "three-dimensional crosslinking" is herein meant that a photo-curing monomer, oligomer or polymer is three-dimensionally polymerized to give a network structure. If such a network structure is formed, the state of the liquid crystalline material from which the cholesteric layer 12 has been formed is optically fixed; and a film that is easy to handle as an optical film and that is stable at normal temperatures can be obtained.

Examples of supporting films that can be used for the alignment substrate 13 include films of plastics such as polyimide, polyamideimide, polyamide, polyether imide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyacrylate, acrylic resins, polyvinyl alcohol, polypropylene, cellulose, triacetyl cellulose, partially saponified triacetyl cellulose, epoxy resins, and phenol resins. These plastic films may be used as a laminate of two or more films and also as uniaxially or biaxially oriented ones. The supporting film may be treated in advance to make its surface hydrophilic or hydrophobic. Although it may not be necessary to separately impart the function of aligning liquid crystalline molecules to the supporting film depending on the composition of the liquid crystal contained in the liquid crystalline material, it is preferable to impart this function to the supporting film before applying the liquid crystalline material to the supporting film. To impart the function of aligning liquid crystalline molecules, an alignment layer is laminated to the supporting film, or the supporting film or the alignment layer laminated to the supporting film is rubbed. It is also possible to impart this function to the supporting film by obliquely depositing silicon oxide on the supporting film. Polyimide, polyamide, polyvinyl alcohol or the like is usually used for forming the alignment layer. Rubbing treatment is usually carried out in the following manner: a rubbing cloth made from rayon, cotton, polyamide, or the like is wrapped around a metallic roll, and this roll is rotated with its surface in contact with a film of polyimide or the like, or a film of polyimide or the like is conveyed with the roll fixed, thereby rubbing the film surface with the rubbing cloth.

Figure 3:
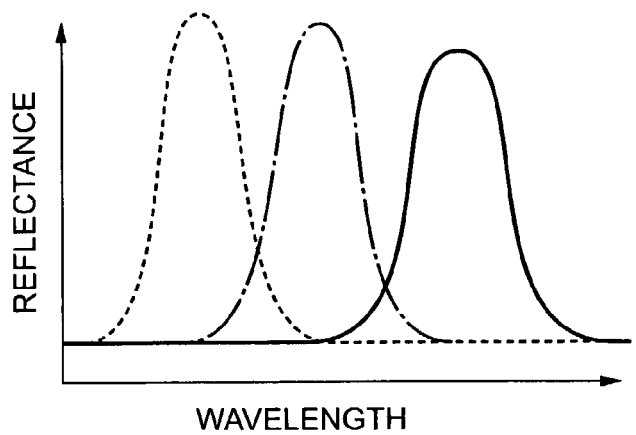
FIG. 3 is a diagram showing the selective reflection wave ranges of cholesteric layers before and after bringing them into contact with an organic solvent.

Thereafter, the cholesteric layer 12 in the semi-cured state, formed on the alignment substrate 13, is brought into contact with an organic solvent 21 (FIG. 2(b)). To bring the cholesteric layer 12 into contact with the organic solvent 21, a variety of development methods such as immersion and spin shower, as well as various of coating methods such as spin coating, die coating and cast coating may be adopted. In this process, uncured portions of the semi-cured cholesteric layer 12 are extracted; extracted herein are uncured portions of both the nematic liquid crystal and chiral agent, which are the chief components of the cholesteric layer 12. When a smaller amount of ultraviolet light is applied to the cholesteric layer 12, a larger part of the cholesteric layer 12 remains uncured, and vice versa. Therefore, in the case where the semi-cured cholesteric layer 12 formed by the application of a small amount of radiation 20 is brought into contact with an organic solvent, uncured portions of the cholesteric layer 12 are extracted in a large amount, and the cholesteric layer 12 is entirely thinned. As a result, the chiral pitch becomes short, and the selective reflection wave range is shifted to the shorter wavelength side. The degree of shift in wavelength thus varies depending upon the state of curing (proportion of uncured portions) of the cholesteric layer 12, regardless of the conditions under which the cholesteric layer 12 is brought into contact with an organic solvent, and the selective reflection wave range of the cholesteric layer 12 is controlled by the degree of this shift (see FIG. 3).

Any organic solvent can be used as the organic solvent 21 in the above process as long as it can dissolve the cholesteric layer 12. Specific examples of such organic solvents include: hydrocarbons such as benzene, toluene, xylene, n-butyl benzene, diethyl benzene and tetralin; ethers such as methoxybenzene, 1,2-dimethoxybenzene and diethylene glycol dimethyl ether; ketones such as acetone, methyl ethyl ketone, methyl isobutyl ketone, cyclohexanone and 2,4-pentanedione; esters such as ethyl acetate, ethylene glycol monomethyl ether acetate, propylene glycol monomethyl ether acetate, propylene glycol monoethyl ether acetate and γ-butyrolactone; amide-type solvents such as 2-pyrrolidone, N-methyl-2-pyrrolidone, dimethylformamide and dimethylacetamide; halogen-containing solvents such as chloroform, dichloromethane, carbon tetrachloride, dichloroethane, tetrachloroethane, trichloroethylene, tetrachloroethylene, chlorobenzene and orthodichloro-benzene; alcohols such as t-butyl alcohol, diacetone alcohol, glycerin, monoacetin, ethylene glycol, triethylene glycol, hexylene glycol, ethylene glycol monomethyl ether, ethyl Cellosolve and butyl Cellosolve; and phenols such as phenol and para-chlorophenol. These solvents can be used either singly or in combination. Such inconveniences that the liquid crystal cannot fully be dissolved in one solvent and that one solvent is likely to dissolve the supporting film, which will be described later, can be avoided by the use of a mixture of two or more solvents. Of the above-enumerated solvents, hydrocarbons and glycol monoether acetates are preferred as solvents to be used singly; and mixtures of ethers or ketones and glycols are preferred as solvent mixtures.

An optical element 10 containing the cholesteric layer 12 formed on the alignment substrate 13 is thus finally obtained (FIG. 2(c)). It is preferable to subject the cholesteric layer 12 to drying and re-alignment treatment at a predetermined temperature, thereby stabilizing the optical properties of the cholesteric layer 12. It is also preferable that, after the drying and re-alignment treatment is completed, a predetermined amount of radiation (ultraviolet light or the like) be applied to the cholesteric layer 12 in the air, more preferably in an inert atmosphere, to re-cure the cholesteric layer 12.

In the above production process, the crystalline material for forming the cholesteric layer 12 may be made into a coating liquid by dissolving it in a solvent. In this case, it is necessary to add the drying step of evaporating the solvent before three-dimensionally crosslinking the liquid crystal layer by the application of radiation 20. As such a solvent, the above-mentioned material for the organic solvent 21 can be used. In this case, the concentration of the solution cannot be specified sweepingly because it depends on the solubility of the liquid crystal in the solvent and the desired thickness of the liquid crystal layer to be formed. In general, however, the concentration is adjusted so that it will fall in the range of 1 to 60% by weight, preferably in the range of 3 to 40% by weight. Surface active agents, etc. may be added to the liquid crystal solution in order to make it easy to apply the solution. Examples of surface active agents that can be added to the liquid crystal solution include: cationic surface active agents such as imidazoline, quaternary ammonium salts, alkylamine oxides and polyamine derivatives; anionic surface active agents such as polyoxyethylene-polyoxypropylene condensation products, primary or secondary alcohol ethoxylates, alkylphenol ethoxylates, polyethyleneglycol and its esters, sodium lauryl sulfate, ammonium lauryl sulfate, amine lauryl sulfate, alkyl-substituted aromatic sulfonates, alkyl phosphates, and aliphatic or aromatic sulfonic acid-formalin condensation products; amphoteric surface active agents such as laurylamidopropylbetaine and laurylaminoacetic acid betaine; nonionic surface active agents such as polyethylene glycol fatty esters and polyoxyethylene alkylamines; and fluorine-containing surface active agents such as perfluoroalkyl sulfonates, perfluoroalkyl carboxylates, perfluoroalkyl ethyleneoxide adducts, perfluoroalkyl trimethylammonium salts, oligomers containing perfluoroalkyl groups and hydrophilic groups, oligomers containing perfluoroalkyl groups and lipophilic groups, and urethanes containing perfluoroalkyl groups. The amount of a surface active agent to be added varies depending upon the type of the surface active agent, the type of the curing liquid crystal, the type of the solvent, and the type of the glass substrate or supporting film to which the liquid crystal solution is applied; and, in general, it is from 10 wt. ppm to 10% by weight, preferably from 100 wt. ppm to 5% by weight, more preferably from 0.1 to 1% by weight of the liquid crystal contained in the solution.

According to the first embodiment of the present invention, the selective reflection wave range of the cholesteric layer 12 can be controlled by changing the amount of the radiation 20 to be applied to the liquid crystal layer formed on the alignment substrate 13, so that it is possible to control the selective reflection wave range of the cholesteric layer 12 with ease and high precision. It is therefore possible to easily produce an optical element 10 that comprises a cholesteric layer 12 having the desired selective reflection wave range and that is excellent in both optical stability and intensity of color.

Figure 4:
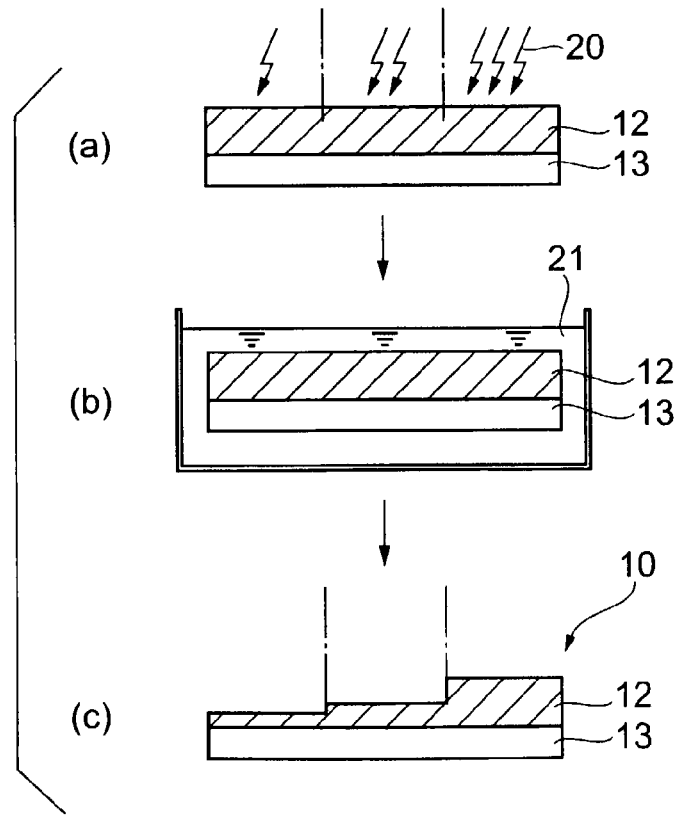
FIG. 4 is a view illustrating another example of a process of producing the optical element shown in FIG. 1.

In the aforementioned first embodiment, the radiation 20 is evenly applied to the entire surface of the liquid crystal layer formed on the alignment substrate 13. The present invention is not limited to this; and the radiation 20 may be applied in different amounts to different regions on the surface of the liquid crystal layer as shown in FIGS. 4(a), 4(b) and 4(c) so that these regions can have different selective reflection wave ranges. By doing so, it becomes possible to produce a color filter or the like having a cholesteric layer 12 on which each pixel has selective reflection wave ranges equal to the wave ranges of red (R), green (G) and blue (B) colors. In this case, the cholesteric layer 12 is formed by bringing, under the specific conditions, the uniformly deposited liquid crystal layer into contact with an organic solvent, and the final thickness of the cholesteric layer 12 differs as shown in FIG. 4(c) according to the regions to which the radiation has been applied in different amounts.

Second Embodiment

Figure 6:
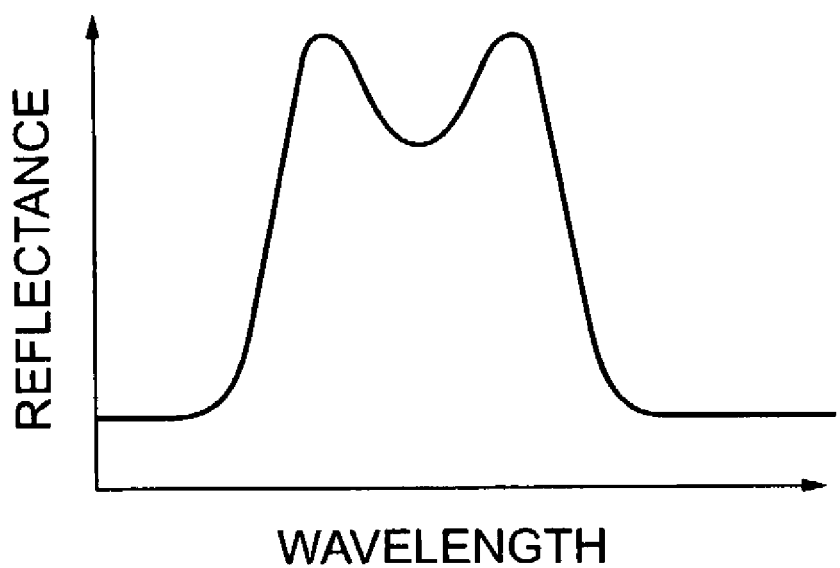
FIG. 6 is a diagram showing the selective reflection wave range of a cholesteric layer composed of a laminate of a plurality of cholesteric films.
Figure 7:
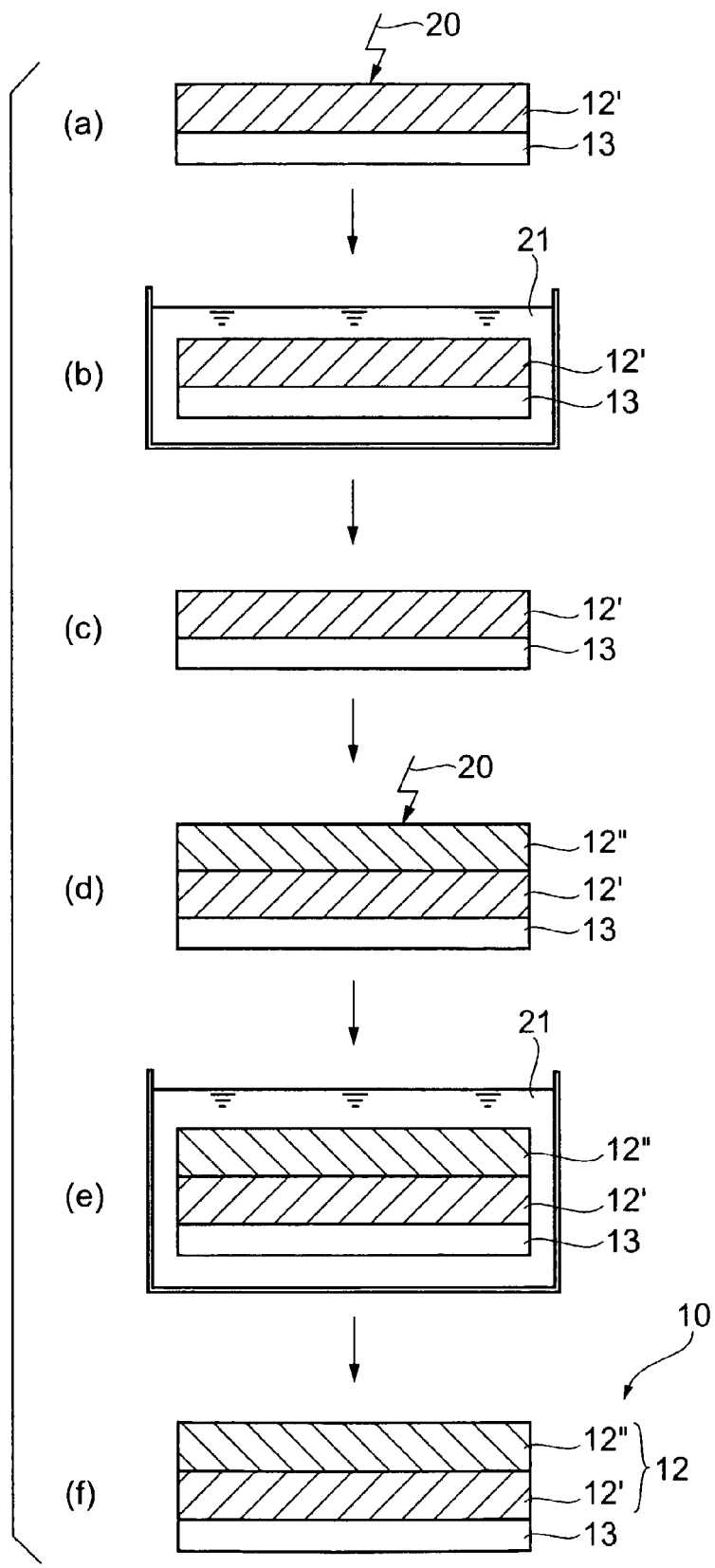
FIG. 7 is a view illustrating an example of a process of producing the optical element shown in FIG. 5.

Next, the second embodiment of the present invention will be described by referring to FIGS. 5 to 7. The second embodiment of the invention is basically the same as the first embodiment shown in FIGS. 1 to 4, except that the cholesteric layer 12 is composed of a laminate of a plurality of cholesteric films 12' and 12". It is noted that like reference characters designate like or corresponding parts throughout several views and that those parts that have been explained in connection with the first embodiment will not be explained any more in detail in the description of the second embodiment.

Figure 5:
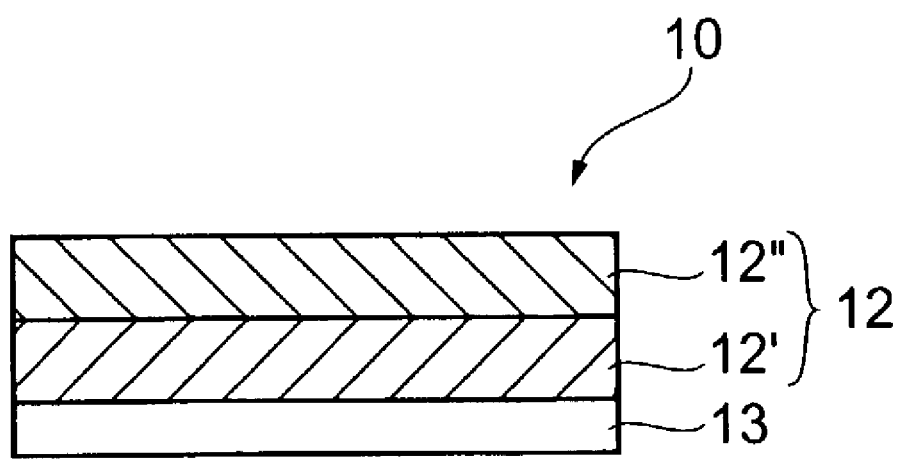
FIG. 5 is a cross-sectional view illustrating an optical element according to a second embodiment of the present invention.

As shown in FIG. 5, an optical element 10 according to the second embodiment of the present invention is composed of: an alignment substrate 13 prepared by conducting alignment treatment; and a cholesteric layer 12 laminated to the alignment substrate 13. The cholesteric layer 12 is composed of a laminate of a plurality of cholesteric films 12' and 12" having different chiral pitches, and has a broad selective reflection wave range covering the selective reflection wave range of the cholesteric film 12' and that of the cholesteric film 12" (see FIG. 6).

Next, a process of producing the optical element 10 according to the second embodiment of the present invention, having the above-described constitution, will be described by referring to FIGS. 7(a)–7(f).

A glass substrate provided with a polyimide (PI) film that has been subjected to rubbing treatment, a supporting film having the function of aligning liquid crystalline molecules, or the like is prepared as the alignment substrate 13 prepared by conducting alignment treatment. On top of this alignment substrate 13, a first liquid crystal layer is formed by the use of a photo-curing chiral nematic liquid crystal having cholesteric regularity. Liquid crystalline molecules in the first liquid crystal layer are aligned by the alignment-regulating action of the alignment substrate 13, where the first liquid crystal layer is subjected to heat treatment, if necessary. A predetermined amount (e.g., from 0.01 to 10000 mJ/cm$^2$) of radiation 20 is applied to the first liquid crystal layer formed on the alignment substrate 13 to three-dimensionally cross-link and cure the first liquid crystal layer. A first cholesteric film 12' is thus formed in the semi-cured state (FIG. 7(a)).

It is possible to use, as the supporting film for use as the alignment substrate 13, any of those materials that are mentioned in the above description of the first embodiment.

Thereafter, the semi-cured first cholesteric film 12' formed on the alignment substrate 13 is brought into contact with an organic solvent 21 (FIG. 7(b)).

There is thus obtained an optical element containing the first cholesteric film 12' formed on the alignment substrate 13 (FIG. 7(c)). It is preferable to subject the first cholesteric film 12' to drying and re-alignment treatment at a predetermined temperature, thereby stabilizing the optical properties of the first cholesteric film 12'. It is also preferable that, after the drying and re-alignment treatment is completed, a predetermined amount of radiation (ultraviolet light or the like) be applied to the first cholesteric film 12' in the air, more preferably in an inert atmosphere, to re-cure the first cholesteric film 12'. Any organic solvent can be used as the organic solvent in the above process as long as it can dissolve the first cholesteric film 12'; and one of the organic solvents enumerated in the above description of the first embodiment, for example, can be used.

Next, by the use of a photo-curing chiral nematic liquid crystal or the like having cholesteric regularity, a second liquid crystal layer is formed on the first cholesteric film 12' provided on the alignment substrate 13. Liquid crystalline molecules in the second crystal layer are aligned by the alignment-regulating action of the first cholesteric film 12', where the second crystal layer is subjected to heat treatment, if necessary. Prior to the formation of the second liquid crystal layer, a polyimide (PI) film may be formed on the first cholesteric film 12' and rubbed. A predetermined amount of radiation 20 is applied to the second liquid crystal layer formed on the first cholesteric film 12' to three-dimensionally cross-link and cure the second liquid crystal layer. A second cholesteric film 12" is thus formed in the semi-cured state (FIG. 7(d)).

The semi-cured second cholesteric film 12" formed on the first cholesteric film 12' is then brought into contact with an organic solvent 21 (FIG. 7(e)).

Thus, there is finally obtained an optical element 10 containing the cholesteric films 12' and 12" on the alignment substrate 13 (FIG. 7(f)). It is preferable to subject the second cholesteric film 12" to drying and re-alignment treatment at a predetermined temperature, thereby stabilizing the optical properties of the second cholesteric film 12". It is also preferable that, after the drying and re-alignment treatment is completed, a predetermined amount of radiation (ultraviolet light or the like) be applied to the second cholesteric film 12" in the air, more preferably in an inert atmosphere, to re-cure the second cholesteric film 12". Any organic solvent can be used as the organic solvent in the above process as long as it can dissolve the second cholesteric film 12"; and one of the organic solvents enumerated in the description of the first embodiment, for example, can be used.

In the above production process, the liquid crystalline materials for forming the cholesteric films 12' and 12" may be made into coating liquids by dissolving them in solvents, as mentioned in the above description of the first embodiment. In this case, it is necessary to add the drying step of evaporating the solvent before three-dimensionally crosslinking each liquid crystal layer by the application of radiation 20.

According to the second embodiment of the present invention, the selective reflection wave ranges of the plurality of cholesteric films 12' and 12" can be controlled by changing the amount of the radiation 20 to be applied to the liquid crystal layer formed on the alignment substrate 13 or on the first cholesteric film 12', so that it is possible to control the selective reflection wave ranges of the plurality of cholesteric films 12' and 12" with ease and high precision. It is therefore possible to easily produce an optical element 10 that comprises a cholesteric layer 12 composed of a laminate of a plurality of cholesteric films 12' and 12" having different selective reflection wave ranges and that is excellent in both optical stability and intensity of color.

EXAMPLES

Example 1

The aforementioned first embodiment of the invention will now be explained more specifically by referring to Example 1.

A photo-curing chiral nematic liquid crystal consisting of 80 parts by weight of a polymerizable nematic liquid crystal, 20 parts by weight of a chiral agent and 1 part by weight of a photopolymerization initiator was dissolved in toluene to obtain a 25 wt. % toluene solution of the chiral nematic liquid crystal.

The nematic liquid crystal used was a liquid crystal containing a compound represented by the following chemical formula (5):

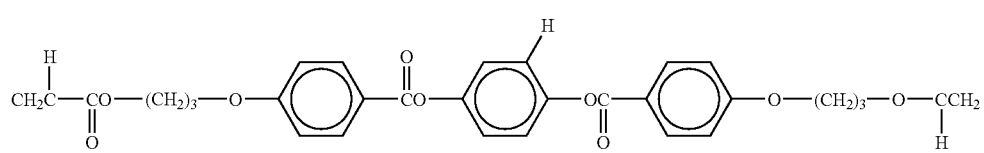

(5)

and a compound represented by the following chemical formula (6):

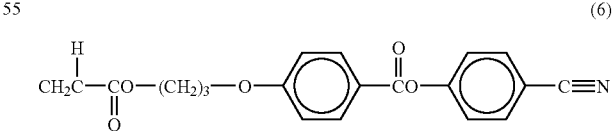

(6)

in the weight ratio of 90:10. Further, a chiral dopant-added liquid crystal "S-811" (manufactured by Merck KGaA, Germany) was used as the chiral agent; and "Irg 631" (available from Ciba Specialty Chemicals K.K., Japan) was used as the photopolymerization initiator.

On the other hand, a glass substrate was coated with polyimide (PI); and the polyimide film formed was rubbed in the definite direction (alignment treatment) to obtain an alignment substrate.

The glass substrate having thereon the polyimide (PI) film that had been subjected to the rubbing treatment was set in a spin coater; and the polyimide film was spin-coated with the above-prepared toluene solution so that the thickness of the solution layer would be from about 3.0 to 5.0 μm.

The alignment substrate coated with the toluene solution was then subjected to drying and alignment treatment with heating at 80° C. for 5 minutes. It was visually confirmed that the liquid crystal layer formed on the alignment substrate was cholesteric.

By the use of an ultraviolet light irradiator having an extra-high pressure mercury vapor lamp, a predetermined amount of ultraviolet light was applied to the liquid crystal layer to three-dimensionally cross-link and polymerize the liquid crystal layer. A cholesteric layer in the semi-cured state was thus formed on the alignment substrate.

The semi-cured cholesteric layer formed on the alignment substrate was immersed in acetone for 5 minutes.

Thereafter, this cholesteric layer was dried with heating at 60° C. for 15 minutes; and 10000 mJ/cm$^2$ of ultraviolet light was applied to the cholesteric layer by an ultraviolet light irradiator having an extra-high pressure mercury vapor lamp to re-cure the cholesteric layer, thereby stabilizing the optical properties of the cholesteric layer.

Thus, there is finally obtained an optical element having the cholesteric layer formed on the alignment substrate.

Figure 8:
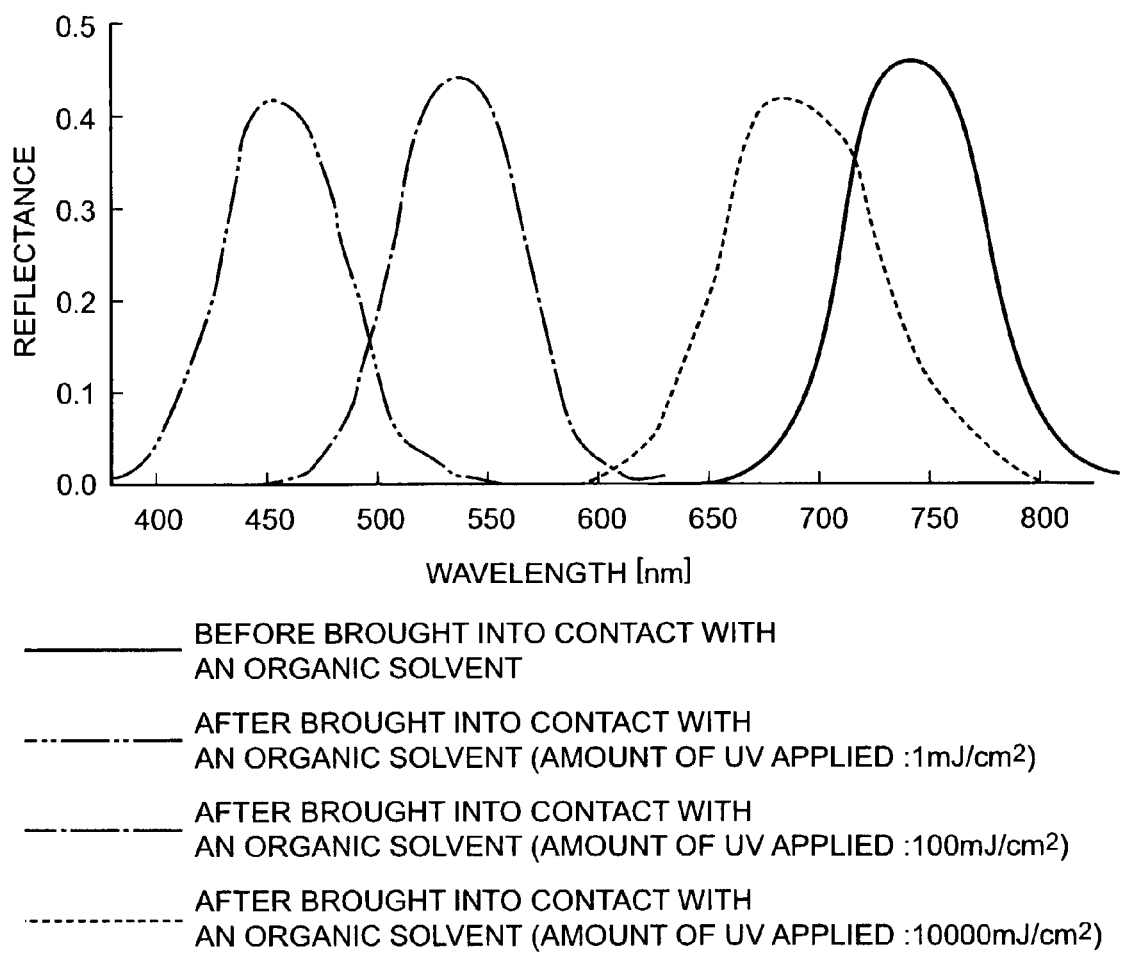
FIG. 8 is a diagram showing the selective reflection wave ranges of the cholesteric layers in Example 1 before and after bringing them into contact with an organic solvent.

In the above-described production process, ultraviolet light was applied in three different amounts, 1 mJ/cm$^2$, 100 mJ/cm$^2$ and 10000 mJ/cm$^2$, to form three cholesteric layers in the semi-cured state, and the selective reflection wavelengths (reflection spectra) of the finally-obtained three optical elements were measured by a spectrophotometer. The results are shown in FIG. 8. Shift to the shorter wavelength side was confirmed in the selective reflection wave range of each cholesteric layer after the cholesteric layer was brought into contact with the organic solvent; and the degree of this shift was found to be greater when the amount of ultraviolet light applied was smaller. In addition, the bandwidth of the selective reflection wave range was approximately 80 nm in all cases.

Example 2

In Example 2, an optical element was produced in the same manner as that of Example 1 except that 3 parts by weight of "Irg 369" (available from Ciba Specialty Chemicals K.K., Japan) was used as the photopolymerization initiator, instead of 1 part by weight of "Irg 631."

Figure 9:
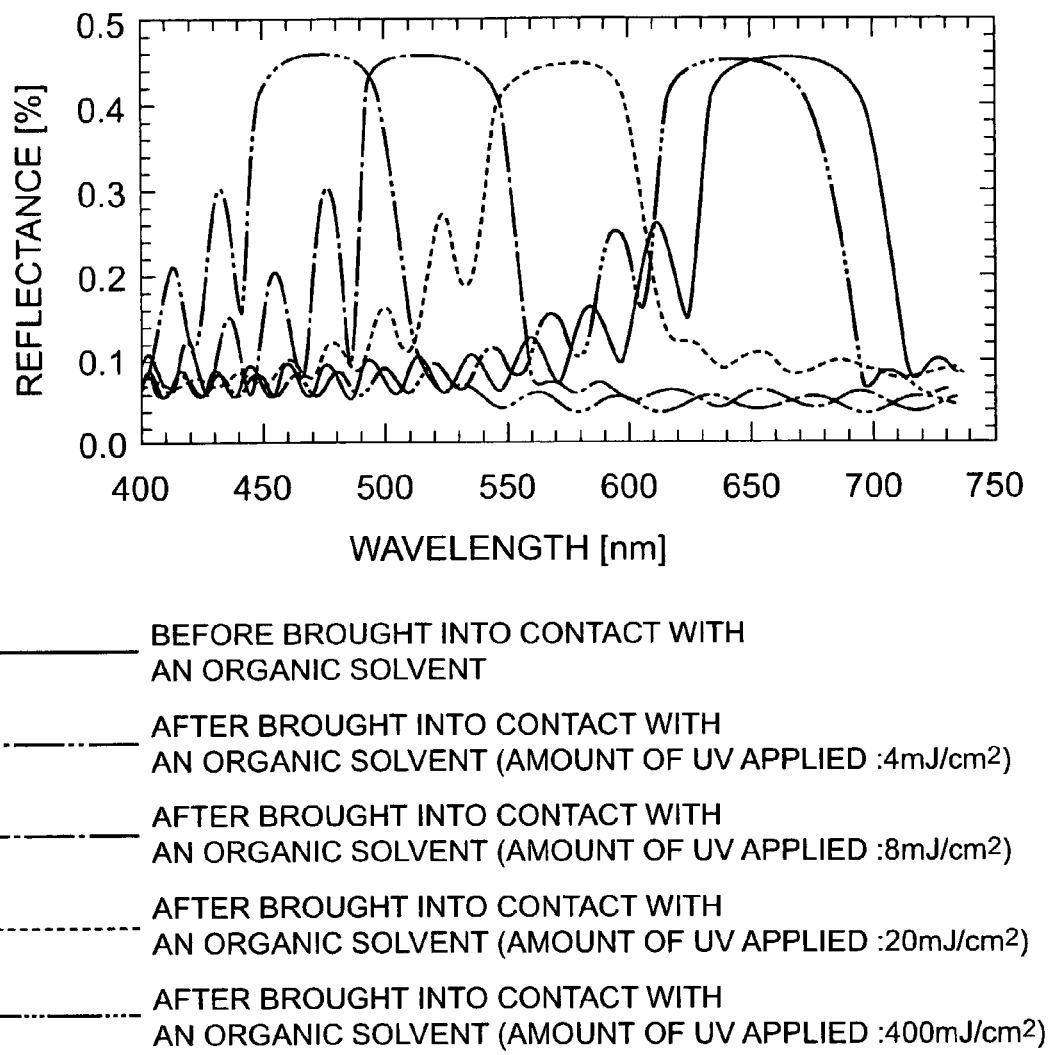
FIG. 9 is a diagram showing the selective reflection wave ranges of the cholesteric layers in Example 2 before and after bringing them into contact with an organic solvent.

In Example 2, ultraviolet light was applied in four different amounts, 4 mJ/cm$^2$, 8 mJ/cm$^2$, 20 mJ/cm$^2$ and 400 mJ/cm$^2$, to form four cholesteric layers in the semi-cured state, and the selective reflection wavelengths (reflection spectra) of the finally-obtained four optical elements were measured by a spectrophotometer. The results are shown in FIG. 9. Similar to Example 1, shift to the shorter wavelength side was confirmed in the selective reflection wave range of each cholesteric layer after the cholesteric layer was brought into contact with the organic solvent. This shift was accomplished with a smaller amount of ultraviolet light as compared with Example 1.

Example 3

The aforementioned second embodiment of the present invention will be explained more specifically by referring to Example 3.

A photo-curing chiral nematic liquid crystal consisting of 80 parts by weight of a polymerizable nematic liquid crystal, 20 parts by weight of a chiral agent and 1 part by weight of a photopolymerization initiator was dissolved in toluene to obtain a 25 wt. % toluene solution of the chiral nematic liquid crystal. The nematic liquid crystal, the chiral agent and the photopolymerization initiator used in this example were the same as those used in Example 1.

On the other hand, a glass substrate was coated with polyimide (PI); and the polyimide film formed was rubbed in the definite direction (alignment treatment) to obtain an alignment substrate.

The glass substrate having thereon the polyimide (PI) film that had been subjected to the rubbing treatment was set in a spin coater, and the polyimide film was spin-coated with the above-prepared toluene solution so that the thickness of the solution layer would be from about 3.0 to 5.0 μm.

The alignment substrate coated with the toluene solution was then subjected to drying and alignment treatment with heating at 80° C. for 5 minutes. It was visually confirmed that the layer formed on the alignment substrate was cholesteric.

By the use of an ultraviolet light irradiator having an extra-high pressure mercury vapor lamp, a predetermined amount of ultraviolet light was applied to the liquid crystal layer to three-dimensionally cross-link and polymerize the liquid crystal layer. A first cholesteric film in the semi-cured state was thus formed on the alignment substrate.

The semi-cured first cholesteric film formed on the alignment substrate was immersed in acetone for 5 minutes.

Thereafter, the first cholesteric film that had been immersed in acetone was spin-coated with the above-prepared toluene solution so that the thickness of the solution layer would be from about 3.0 to 5.0 μm.

This layer was then subjected to drying and alignment treatment with heating at 80° C. for 5 minutes. It was visually observed that the layer formed on the first cholesteric film was cholesteric.

By the use of an ultraviolet light irradiator having an extra-high pressure mercury vapor lamp, a predetermined amount of ultraviolet light was applied to the liquid crystal layer to three-dimensionally cross-link and polymerize the liquid crystal layer. A second cholesteric film in the semi-cured state was thus formed on the first cholesteric film.

The semi-cured second cholesteric film formed on the first cholesteric film was then immersed in acetone for 5 minutes.

This cholesteric film was dried with heating at 60° C. for 15 minutes. 10000 mJ/cm$^2$ of ultraviolet light was then applied to the cholesteric layer by an ultraviolet light irradiator having an extra-high pressure mercury vapor lamp to re-cure the cholesteric layer, thereby stabilizing the optical properties of the cholesteric layer.

Thus, there was finally obtained an optical element containing the cholesteric layer composed of two cholesteric films, formed on the alignment substrate.

Figure 10:
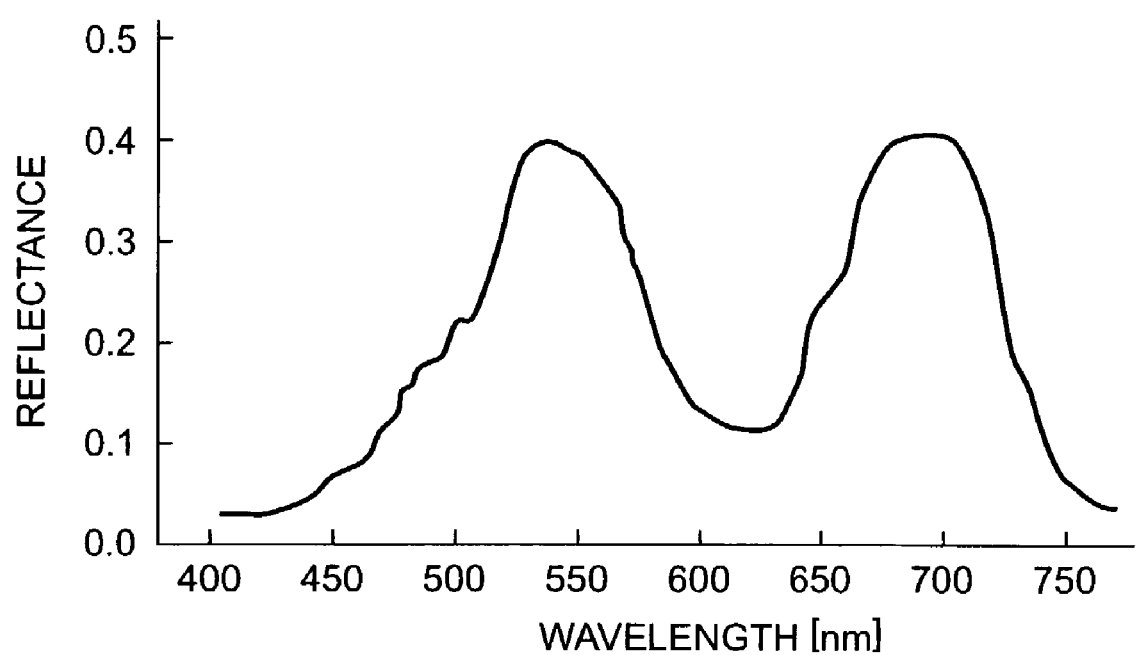
FIG. 10 is a diagram showing the selective reflection wave range of the cholesteric layer in Example 3, composed of a laminate of two cholesteric films.

To form the cholesteric layer in the semi-cured state in the above process, 100 mJ/cm$^2$ of ultraviolet light was applied to the first cholesteric film, while 10000 mJ/cm$^2$ of ultraviolet light was applied to the second cholesteric film. The selective reflection wavelength (reflection spectrum) of the optical element finally obtained was measured by a spectrophotometer. As a result, the optical element containing the cholesteric layer composed of the laminate of the two cholesteric films, formed by applying ultraviolet light in different amounts, was found to have the optical properties (broad selective reflection wave range) covering the optical properties (selective reflection wave range) of the first cholesteric film and those of the second cholesteric film, as shown in FIG. 10.

What is claimed is:

1. An optical element comprising a only a single cholesteric layer having cholesteric regularity such that the cholesteric layer transmits one of a right-handed circularly polarized component and a left-handed circularly polarized component while reflecting an other of the right-handed circularly polarized component and the left-handed circularly polarized component;

wherein:

the cholesteric layer comprises a three-dimensionally polymerized layer formed of a cured radiation-curable liquid crystal;

the cholesteric layer comprises a plurality of regions at different positions on a surface of the cholesteric layer, each of the plurality of regions having a different thickness, thereby the single cholesteric layer varies in thickness, in a stepwise fashion, along its surface; and each of the plurality of regions has a different chiral pitch corresponding to its respective thickness such that each of the plurality of regions has a different selective reflection wave range.

2. The optical element according to claim 1, wherein:

the plurality of regions comprises a first region, a second region and a third region;

the first region has a selective reflection wave range including a wave range of red color, the second region has a selective reflection wave range including a wave range of green color, the third region has a selective reflection wave range including a wave range of blue color; and the first, second and third regions form a pixel.

3. The optical element according to claim 1, wherein each of the plurality of regions has a visible selective reflection wave range.

* * * * *